E. F. SYMONDS & R. J. GOODNOW.
LEMON SERVER.
APPLICATION FILED JAN. 31, 1910.
971,573.
Patented Oct. 4, 1910.
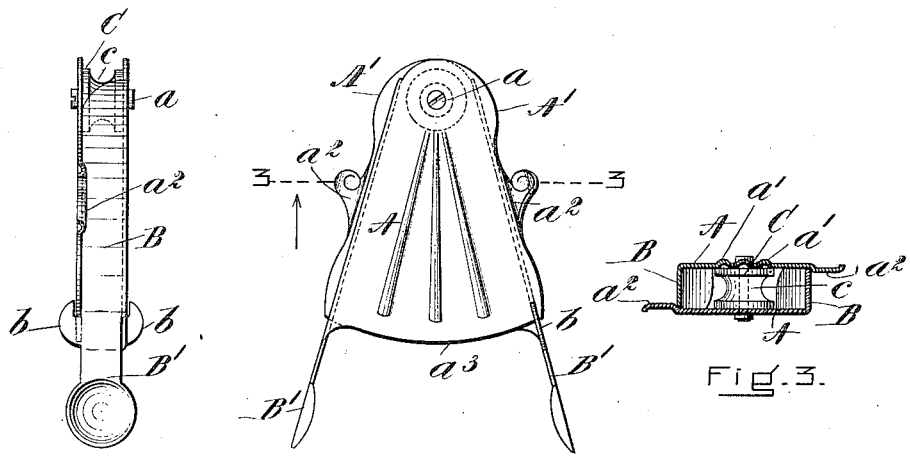
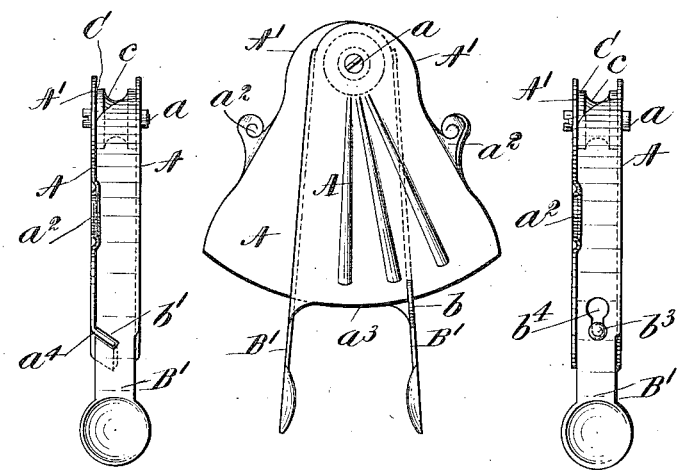
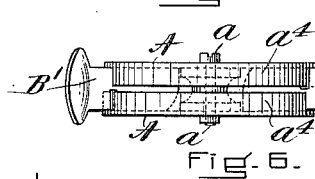
WITNESSES:
M. E. Flaherty.
George Langton.
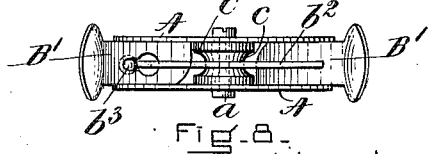
INVENTORS:
Ernest F. Symonds
Russell J. Goodnow
By
their attorneys.

UNITED STATES PATENT OFFICE.

ERNEST F. SYMONDS, OF SALEM, AND RUSSELL J. GOODNOW, OF BOSTON, MASSACHUSETTS.

LEMON-SERVER.

971,573.  Specification of Letters Patent.  Patented Oct. 4, 1910.

Application filed January 31, 1910. Serial No. 541,051.

*To all whom it may concern:*

Be it known that we, ERNEST F. SYMONDS, of Salem, in the county of Essex and State of Massachusetts, and RUSSELL J. GOODNOW, of Boston, in the county of Suffolk, in said State, both citizens of the United States, have invented a new and useful Improvement in Lemon-Servers, of which the following is a specification.

Our invention is especially intended for serving sliced fruit such as lemons and for this purpose one embodiment of it is provided not only with means for squeezing the edges of the slice together but also for preventing the faces of the slice from buckling, so that the slice is squeezed on all four sides, thus securing a practically clean ejection of the pulp and juice from the slice and leaving nothing but the outer and inner skins.

Our invention is capable of being embodied in a variety of forms and lends itself well to ornamentation, and its simplicity is noticeable in that it comprises in its preferred form two members identical in shape pivoted together about a suitable hinge-pin.

Our invention will be understood by reference to the drawings, in which—

Figure 1 is a plan of a device embodying our invention, Fig. 2 being an edge view, and Fig. 3 a section on line 3—3 of Fig. 1. Fig. 4 shows the device in a partially closed position. Fig. 5 is an edge view of a modification, Fig. 6 being an end view thereof. Fig. 7 is a side view of another modification, and Fig. 8 an end view thereof.

One feature of our invention is that the device is made in two parts identical in shape. Each of these parts or members comprises a flat plate A which forms the top or bottom of the device, which plate has a side piece B bent at right angles thereto to form the side of the device and extended beyond the edge of the plate to form a handle $B^1$. These two members are pivoted together by means of a hinge-pin $a$ which passes through a sleeve C and thus form a chamber to retain the fruit which chamber may be contracted by pressing the handles together.

In practice the slice or section of fruit to be squeezed is laid in the chamber with its faces parallel with the plates A, the handles $B^1$, $B^1$ being separated sufficiently for the purpose. The server being then held in a vertical position, for example over a cup of tea or other receptacle for the juice, the two handles $B^1$, $B^1$ are pressed together (see Fig. 4) to contract the chamber so that the fruit is compressed between the sides B, the plates A also serving to confine the slice and to that extent adding to the squeezing function of the apparatus.

In order that the pivoted end of the device may allow the juice to escape, we prefer that the sleeve C shall be grooved at $c$, thus leaving passages between it and the walls B ample for the purpose. We also prefer to corrugate or channel the plates A as shown at $a^1$ to allow the juice opportunity to flow off as above described. Instead of grooving the sleeve C the sides A may be perforated in which case the server should be used horizontally.

In addition to the above which are the main features of the apparatus, we prefer that each plate A shall overlap the edge of the side wall B of the other member as shown at $A^1$ so that however much the handles $B^1$ may be separated a portion of the plate A of one member will always rest upon a portion of the edge of the side B of the other member so that as the two are brought together again the part $A^1$ of each member will guide the plate A of which it is part over the side B of the other member.

In order that the two members may not swing apart unnecessarily, we prefer also to provide bosses $a^2$ the inner edges of which will engage the outer edges of the parts B as shown in Fig. 3 when the server is open a proper amount. In order also that the members shall not separate at their free ends during the squeezing operation, but shall be held firmly together to prevent the buckling of the slice, we have provided in the form of our invention shown in Figs. 1 and 2 a lug $b$ on each handle $B^1$ which lug is slotted and overlaps slightly the front edge $a^3$ of the plate A of which it is not a part. Other means of accomplishing this result are shown in Figs. 5 and 6. In this case the front edge of each plate A is bent inward as shown at $a^4$ and each handle $B^1$ is slotted as shown at $b^1$ so that this inwardly bent portion or flange $a^4$ on the plate rides in the slots $b^1$. It will be noted that in this particular form of our device this flange serves the additional purpose of preventing the slice from being squeezed out during the squeezing operation.

In Figs. 7 and 8 we have shown a wire $b^2$ one end of which is fastened to one of the handles $B^1$ while the other end carries a small ball $b^3$ which passes through a keyhole slot $b^4$ in the other handle $D^1$ and engages with the narrow portion of the slot $b^4$ through which it is too large to pass. This wire performs the function of the bosses $a^2$ in keeping the parts from swinging too far apart.

This device so far as we know has considerable novelty and its features of novelty are capable of embodiment in various forms and the device itself may be used in various ways. We have shown each of the two members as rectangular in cross section as that seems to be the simplest and best form of construction, one which lends to economy of construction as the two members can be made with the same die, but of course this is not essential to an embodiment of our invention. We prefer that the server should be drained from its small end through the openings $c$ which we have there provided, but as stated above it is evident that by perforating either or both of the plates A they may serve for draining purposes. Moreover, while we have shown means for limiting the movement of each plate or member with relation to the other, other means for this purpose may be provided or such feature may be omitted. The guiding of the two members with relation to each other is desirable but not essential to the operation of the device.

What we claim as our invention is:—

1. The lemon server above described composed of two members pivoted together, each member having parts forming two walls of a contractible chamber, said chamber having a drain opening as described.

2. The lemon server above described composed of two members pivoted together, each member having parts forming two walls of a contractible chamber, said chamber having a drain opening as described and means for contracting said chamber.

3. A lemon server composed of two members pivoted together, said members being alike and each shaped to form two sides of a contractible chamber.

4. In a lemon server, two members pivoted together, each forming two sides of a contractible chamber, and means for limiting the separating movement of said members about its pivot.

5. In a lemon server, two members pivoted together, each forming two sides of a contractible chamber, and means whereby the walls of said members which are contracted in contracting said chamber are always maintained at the same distance apart.

6. In a lemon server, two members each composed of two walls located at right angles to each other and pivoted together whereby the walls of one member will contact with the walls of the other member to form a chamber capable of contraction, one of the walls of each member overlapping one of the walls of the other member.

7. In a lemon server, two members pivoted together to form a contractible chamber and forming two walls thereof, one wall of each member overlapping the adjacent wall of the other member and means whereby said walls are always maintained in overlapping position.

ERNEST F. SYMONDS.
RUSSELL J. GOODNOW.

Witnesses:
FRANK M. EDMONDS,
HELEN M. FARRELL.